US012621886B2

(12) United States Patent
Thomas et al.

(10) Patent No.: US 12,621,886 B2
(45) Date of Patent: May 5, 2026

(54) METHODS AND SYSTEMS FOR ENHANCED DEVICE PAIRING

(71) Applicant: Shopify Inc., Ottawa (CA)

(72) Inventors: James David Thomas, Newmarket (CA); Gulamhusein Moledina, Bolton (CA)

(73) Assignee: Shopify Inc., Ottawa (CA)

( * ) Notice: Subject to any disclaimer, the term of this patent is extended or adjusted under 35 U.S.C. 154(b) by 403 days.

(21) Appl. No.: 18/361,013

(22) Filed: Jul. 28, 2023

(65) Prior Publication Data

US 2025/0039960 A1     Jan. 30, 2025

(51) Int. Cl.
| *H04W 4/00* | (2018.01) |
| *H04W 48/16* | (2009.01) |
| *H04W 76/14* | (2018.01) |
| *H04W 84/12* | (2009.01) |

(52) U.S. Cl.
CPC ........... *H04W 76/14* (2018.02); *H04W 48/16* (2013.01); *H04W 84/12* (2013.01)

(58) Field of Classification Search
CPC ..... H04W 76/14; H04W 48/16; H04W 84/12; H04W 76/00
USPC ......................................................... 370/329
See application file for complete search history.

(56) References Cited

U.S. PATENT DOCUMENTS

| 10,264,448 | B2 * | 4/2019 | Agardh .................. H04W 12/04 |
| 11,283,937 | B1 * | 3/2022 | Svendsen ........... H04N 1/00209 |
| 11,924,643 | B2 * | 3/2024 | Kaushik .............. H04W 64/003 |
| 12,047,871 | B2 * | 7/2024 | McCann ................ H04W 48/16 |
| 12,106,641 | B2 * | 10/2024 | Ingrassia, Jr. .......... G08B 21/24 |
| 12,143,895 | B2 * | 11/2024 | Movva .................. H04W 76/14 |
| 2013/0028245 | A1 * | 1/2013 | Oerton .................. H04W 64/00 |
| | | | 455/456.1 |
| 2014/0194062 | A1 * | 7/2014 | Palin ..................... H04W 24/00 |
| | | | 455/67.11 |
| 2015/0334569 | A1 * | 11/2015 | Rangarajan ......... H04W 12/122 |
| | | | 726/4 |
| 2017/0245280 | A1 * | 8/2017 | Yi ............................ H04K 3/00 |
| 2019/0373058 | A1 * | 12/2019 | De Almeida Forjaz De |
| | | | Lacerda .............. H04L 67/1074 |
| 2021/0058936 | A1 * | 2/2021 | Gordaychik ...... H04W 72/0453 |
| 2021/0100027 | A1 * | 4/2021 | Xue .................. H04W 74/0836 |
| 2021/0352463 | A1 * | 11/2021 | Speight ................... H04W 4/80 |
| 2023/0015477 | A1 * | 1/2023 | Verburg ................. G06N 20/00 |
| 2023/0328635 | A1 * | 10/2023 | Detwiler ............... H04W 48/16 |
| | | | 455/434 |
| 2023/0388840 | A1 * | 11/2023 | Au ........................... G01S 13/88 |
| 2024/0183936 | A1 * | 6/2024 | Au ........................... H04L 67/12 |
| 2024/0322861 | A1 * | 9/2024 | Zhang ................... H04W 76/14 |

\* cited by examiner

*Primary Examiner* — Marceau Milord

(74) *Attorney, Agent, or Firm* — Moffat & Co

(57)          ABSTRACT

A computer-implemented method including receiving, at a first device from a second device, a wireless beacon transmission; obtaining, by the first device from the wireless beacon transmission, an identifier for the second device; initiating, by the first device, a connection to the second device via a local area network using connection parameters determined based on the identifier; and establishing a pairing relationship between the first device and the second device based on the connection.

20 Claims, 9 Drawing Sheets

METHODS AND SYSTEMS FOR ENHANCED DEVICE PAIRING

FIELD OF THE DISCLOSURE

The present disclosure is related to device pairing and in particular relates to device pairing on a Local Area Network.

BACKGROUND

Devices within a Local Area Network (LAN), such as those on a single Internet Protocol subnet, may occasionally need to be paired with other devices on that subnet. For example, in a retail setting, a portable point of sale terminal may need to be paired with a device that displays shopping cart and checkout information to the customer.

SUMMARY

When multiple point of sale terminals exist in the store, and multiple screen devices also exist at various locations in the store, discovering and pairing of the devices becomes more difficult. Specifically, LAN discovery protocols allow devices to find each other on the LAN. However, in an environment where there are multiple point of sale devices and multiple displaying devices, there may be a specific need to make 1-to-1 pairings between a point of sale device and a display device to support the point of sale device displaying to the correct display device and/or receive user input from the display device.

In accordance with embodiments of the present disclosure, beacon signals from one device may be received by a second device and information from within that beacon signal may be used to initiate a connection between the first device and the second device.

Therefore, in one aspect, a computer-implemented method may be provided. The method may include receiving, at a first device from a second device, a wireless beacon transmission and obtaining, by the first device from the wireless beacon transmission, an identifier for the second device. The method may further include initiating, by the first device, a connection to the second device via a local area network using connection parameters determined based on the identifier and establishing a pairing relationship between the first device and the second device based on the connection.

In some embodiments, the initiating the connection to the second device via the local area network using connection parameters determined based on the identifier may comprise using the identifier in a local area network discovery query to obtain connection parameters for the second device, and initiating a connection to the second device using the connection parameters.

In some embodiments, the method may further comprise determining, based on a signal strength of the beacon, a proximity of the first device to the second device, wherein the receiving, obtaining, initiating, and establishing is conditioned on the proximity being within a determined threshold.

In some embodiments, a plurality of second devices are part of the local area network, and the method may further comprise determining, based on a signal strength of the beacon, the second device from the plurality of second devices that is closest to the first device; and performing the extracting, using and connecting with the determined second device.

In some embodiments, the method may further comprise receiving, at the first device from a third device, a wireless beacon transmission, the third device being one of the plurality of second devices; obtaining, by the first device from the wireless beacon transmission, a third device identifier; determining, at the first device, that the third device has a proximity closer than the second device; initiating, by the first device, a connection to the third device via a local area network using connection parameters determined based on the third device identifier; and establishing a pairing relationship between the first device and the third device based on the connection.

In some embodiments, the method may further comprise detecting a loss of the connection with the second device and using stored connection parameters to reestablish the connection between the first device and second device.

In some embodiments, the method may further comprise determining that the reestablishment of the connection between the first device and the second device was unsuccessful; detecting the beacon; using an identifier in the beacon to obtain new connection parameters; and using the new connection parameters to reestablish the connection between the first device and second device.

In some embodiments, the method may further comprise determining that the connecting was unsuccessful; and utilising a secondary connection process to pair the first device and the second device.

In some embodiments, the secondary connection process may be at least one of a Local Area Network Discovery process; and a display of a connection code on the second device for input into the first device.

In some embodiments, the connecting may further comprise receiving, via a user interface of the first device, a code displayed on the second device.

In another aspect a first device having a processor and a communications subsystem may be provided. The first device may be configured to receive, from a second device, a wireless beacon transmission and obtain from the wireless beacon transmission, an identifier for the second device. The first device may further be configured to initiate a connection to the second device via a local area network using connection parameters determined based on the identifier and establish a pairing relationship between the first device and the second device based on the connection.

In some embodiments, the first device may be configured to initiate the connection to the second device via the local area network by: using the identifier in a local area network discovery query to obtain connection parameters for the second device; and initiating a connection to the second device using the connection parameters.

In some embodiments, the first device may further be configured to determine, based on a signal strength of the beacon, a proximity of the first device to the second device, wherein the first device is conditioned to receive, obtain, initiate, and establish based on the proximity being within a determined threshold.

In some embodiments, a plurality of second devices may be part of the local area network. The first device may further be configured to determine, based on a signal strength of the beacon, the second device from the plurality of second devices that is closest to the first device; and perform the extracting, using and connecting with the determined second device.

In some embodiments, the first device may further be configured to: receive, from a third device, a wireless beacon transmission, the third device being one of the plurality of second devices; obtain, from the wireless beacon transmission, a third device identifier; determine, at the first device, that the third device has a proximity closer than the second device; initiate a connection to the third device via a local area network using connection parameters determined based on the third device identifier; and establish a pairing relationship between the first device and the third device based on the connection.

In some embodiments, the first device may further be configured to detect a loss of the connection with the second device; and use stored connection parameters to reestablish the connection between the first device and second device.

In some embodiments, the first device may further be configured to determine that the reestablishment of the connection between the first device and the second device was unsuccessful; detect the beacon; use an identifier in the beacon to obtain new connection parameters; and use the new connection parameters to reestablish the connection between the first device and second device.

In some embodiments, the first device may further be configured to determine that the connecting was unsuccessful; and utilise a secondary connection process to pair the first device and the second device.

In some embodiments, the secondary connection process may be at least one of a Local Area Network Discovery process; and a display of a connection code on the second device for input into the first device.

In a further aspect, a computer-readable medium for storing instruction code may be provided. The instruction code, when executed by a processor of a first device, may cause the first device to receive, at the first device from a second device, a wireless beacon transmission and obtain from the wireless beacon transmission, an identifier for the second device. The instruction code, when executed by a processor of a first device, may further cause the first device to initiate a connection to the second device via a local area network using connection parameters determined based on the identifier and establish a pairing relationship between the first device and the second device based on the connection.

BRIEF DESCRIPTION OF THE DRAWINGS

The present disclosure will be better understood with reference to the drawings, in which.

DETAILED DESCRIPTION

Figure 1:
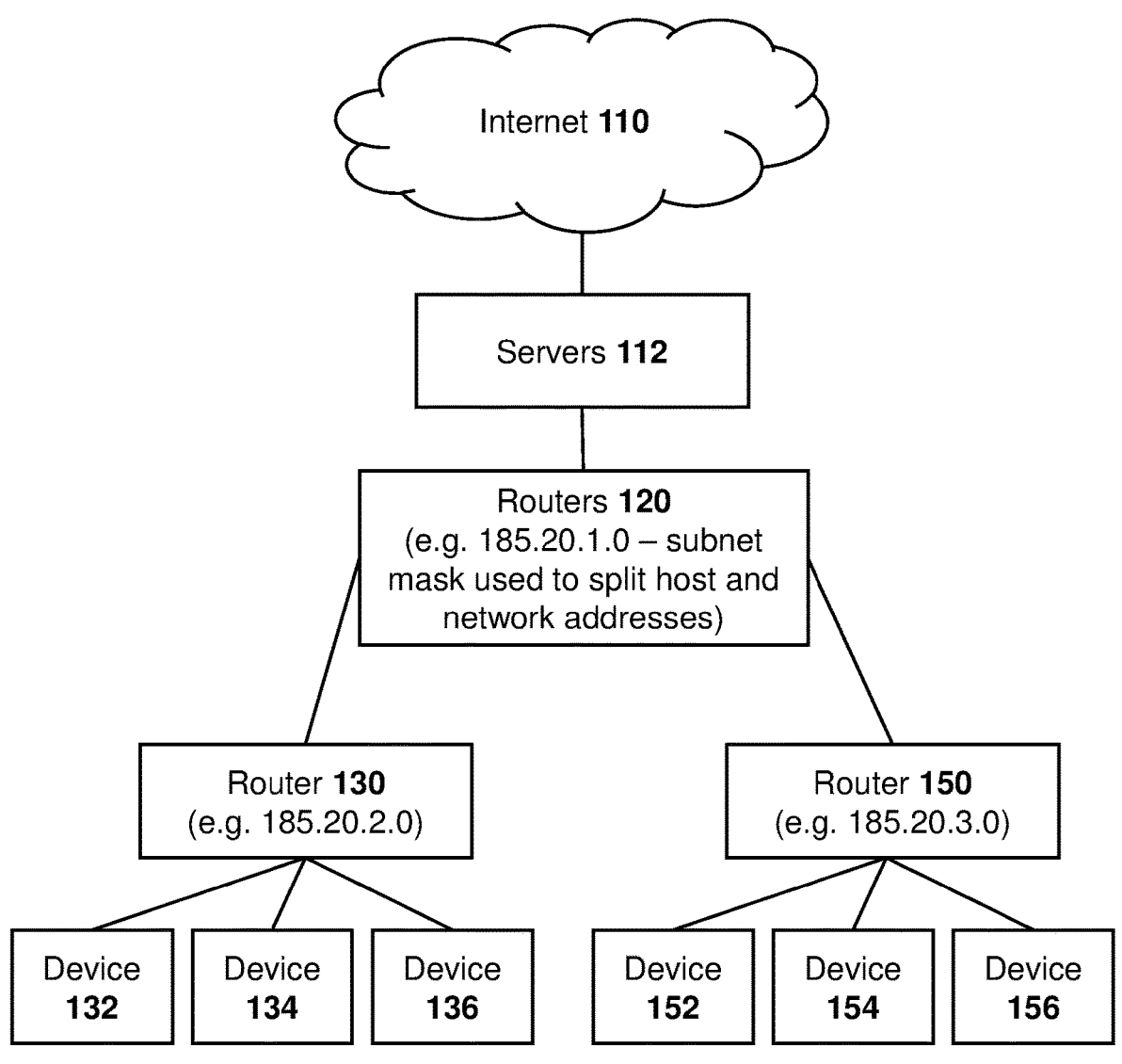
FIG. 1 is a block diagram showing an example network have various subnetworks.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The present disclosure is directed to the pairing of a first device with a second device. The first device may, as described herein, be a point of sale terminal that may be mobile within a retail environment. The second device may, for example, be a display device capable of displaying shopping cart and checkout information and potentially receiving input from a user. However, in other cases the first device and second device could be any device capable of communicating over a local area network.

Some current pairing techniques include the use of a QR code on the second device which may be scanned by the first device. The QR code contains a connection string for the second device, which may include an IP address, a port number to download a secure socket layer (SSL) certificate; a port number to establish the connection; an SSL certificate hash, a schema version number, a device type, among other information. For example, the connection string may be: 92.168.86.27;27000;27001; 463845hdgh278eh2w8dh38dhwjwjwoi2i;5;1, and is encoded in the QR code. In some cases, the devices that are attempting to connect to each other may be required to be on the same LAN. For example, this may include the same Wi-Fi network, ethernet network, a hotspot created by a device using a cellular network, or other type of network.

The first device acts like the client and can scan the QR Code using a camera to establish a connection. This is called "manual pairing".

However, such scanning may involve switching between applications on the first device, and can be cumbersome. In other cases, while the scanning may be on the same application, a point of frustration may be for a merchant to move from behind the countertop to in front of a customer display to scan the code. Other factors making the manual pairing cumbersome are also possible.

Further, if the connection is dropped, for example because the Dynamic Host Configuration Protocol (DHCP) changes the Internet Protocol (IP) address of the second device, then re-establishing the connection would be impossible since the IP address of the second device would be different.

Thus, in accordance with the embodiments herein, the second device may transmit a beacon that can be discovered by the first device. In some embodiments, the beacon may comprise a known static Universally Unique Identifier (UUID), as well as major and minor identifiers for the second device. Such major and minor identifiers may be static and uniquely identify the second device within the network. The beacon may be any form of beacon, and may include an iBeacon, a Bluetooth™ beacon, a Bluetooth Low Energy (BLE) beacon, a Wi-Fi beacon, among others.

In addition to the second device transmitting a beacon, it can also broadcast itself as a service available on the network, similar to a shared printer on the network. Such network service broadcast may include information such as the name of the second device, an identifier for the second device and connection parameters. In some cases, the identifier for the second device may be a combination of major and minor identifiers that are also transmitted with the beacon. In some cases, the connections parameters may include a string, for example separated by semi-colon. However, this could be just an implementation detail. In other cases, each connection parameter can be a separate field rather than just a string that has all parameters grouped together. Other options are possible.

If using a connection string, the connection string may be similar to the connection string as described above for the QR code. In this case, and in the case where parameters may be separate fields, the connection parameters can be used to connect a first device to the second device. In accordance with embodiments of the present disclosure, the identifier is static, regardless of whether the connection parameters change.

In this regard, a first device may receive the beacon, check that the UUID in the beacon pertains to the discovery service, and retrieve the major and minor identifiers from the beacon. In some cases, if the first device has connected to this second device before, it may have stored the connection parameters and may make the connection immediately. If this is the first time connecting, or if the stored connection parameters are no longer valid, the first device may use LAN discovery to obtain the connection parameters from the network based on the unique identifier.

Based on the connection parameters, the first device may then initiate a connection with the second device.

Network Environment

Reference is now made to FIG. 1, which shows an example environment in which traffic destined for a device may be sent over a wide area network such as the Internet 110. Such traffic may be routed through servers 112 to a subnet router 120, which uses a subnet mask to split the host and network addresses. For example, in the embodiment of FIG. 1, the router 120 may use an address 185.20.1.0.

The network may have various subnets, and these may be served by router 130, which may route packets to a sub network 185.20.2.0 and a router 150 which may route packets to a subnet 185.20 dot 3.0 in the example of FIG. 1.

A plurality of devices may exist in each sub network. In the example of FIG. 1, devices 132, 134 and 136 are part of the first sub network under router 130. Devices 152, 154 and 156 are part of a second sub network under router 150. While the embodiment of FIG. 1 shows the device is connected directly to the router, in practical embodiments, the devices may connect through other network appliances or devices before interacting with router 130 or 150.

If a device wants to use network discovery to find another device on the same sub network, the local area network may have a routing table which provides information about the other devices on the network. Such local area network may store such routing table at the router 130, the router 120, or on servers 112, among other options.

However, in situations where a plurality of devices may connect with a plurality of other devices, such network location may not provide sufficient information. For example, in the situation where a portable point of sale terminal moves about a physical storefront, in some situations the point of sale terminal may need to connect with a network connected screen to allow for a transaction to take place. The screen may, for example, show the items in the customer's shopping cart, a subtotal for items processed so far, taxes, and the total amount owing, among other information in some cases. If the storefront has a plurality of screens located throughout the store it may not be evident from network discovery which screen is close to the point of sale terminal.

In this regard, in accordance with embodiments of the present disclosure, the first device on the local area network may utilize a beacon signal to advertise its presence to a second device. The beacon may include various information which could assist in the establishment of a connection between the first device and the second device.

Figure 2:
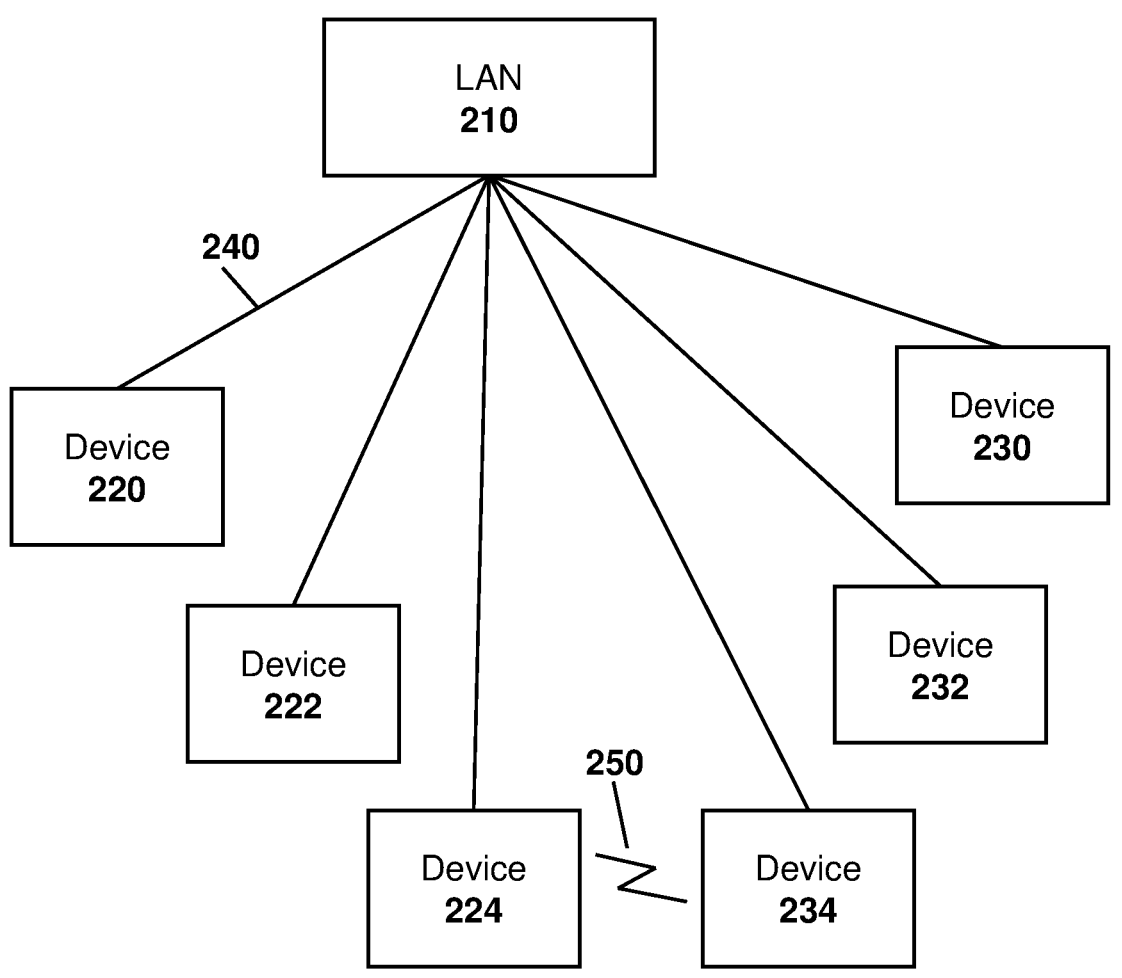
FIG. 2 is a block diagram showing a local area network in which a plurality of devices may communicate with the LAN and further through transmission of wireless beacons.

Reference is now made to FIG. 2. In the embodiment of FIG. 2, various devices may be connected to a local area network 210. For example, the local area network may be a sub network as described with regard to FIG. 1.

A plurality of devices 220, 222 and 224 may form a first type of device within the local area network 210. Similarly, a plurality of devices 230, 232 and 234 may form a second type of device within the local area network 210.

Each of devices 220, 222, 224, 230, 232 and 234 may have a network connection 240 with the local area network 210. For example, network connection 240 may be a wired connection such as an Ethernet connection. In other cases, network connection 240 may be a wireless connection such as a Wi-Fi connection, among other examples.

Further, as described in more detail below, each of devices 220, 222 and 224 may be capable of emitting a beacon 250 which may be received by devices 230, 232 and 234. For example, such beacon may be a Bluetooth beacon, a Bluetooth Low Energy (BLE) beacon, a ZigBee beacon, an IrDA beacon, among others.

For example, in one case, the beacon may use the iBeacon protocol, which is a BLE protocol introduced by Apple™ in 2013. In some cases, the beacon may use an AltBeacon protocol, which is an open source alternative to iBeacon. In some cases, the beacon may use the Eddystone protocol, which was introduced by Google in 2015. Such beacon protocols are merely provided for illustration, other beacon technologies and protocols may be used with embodiments of the present disclosure.

Establishing a Connection

Figure 3:
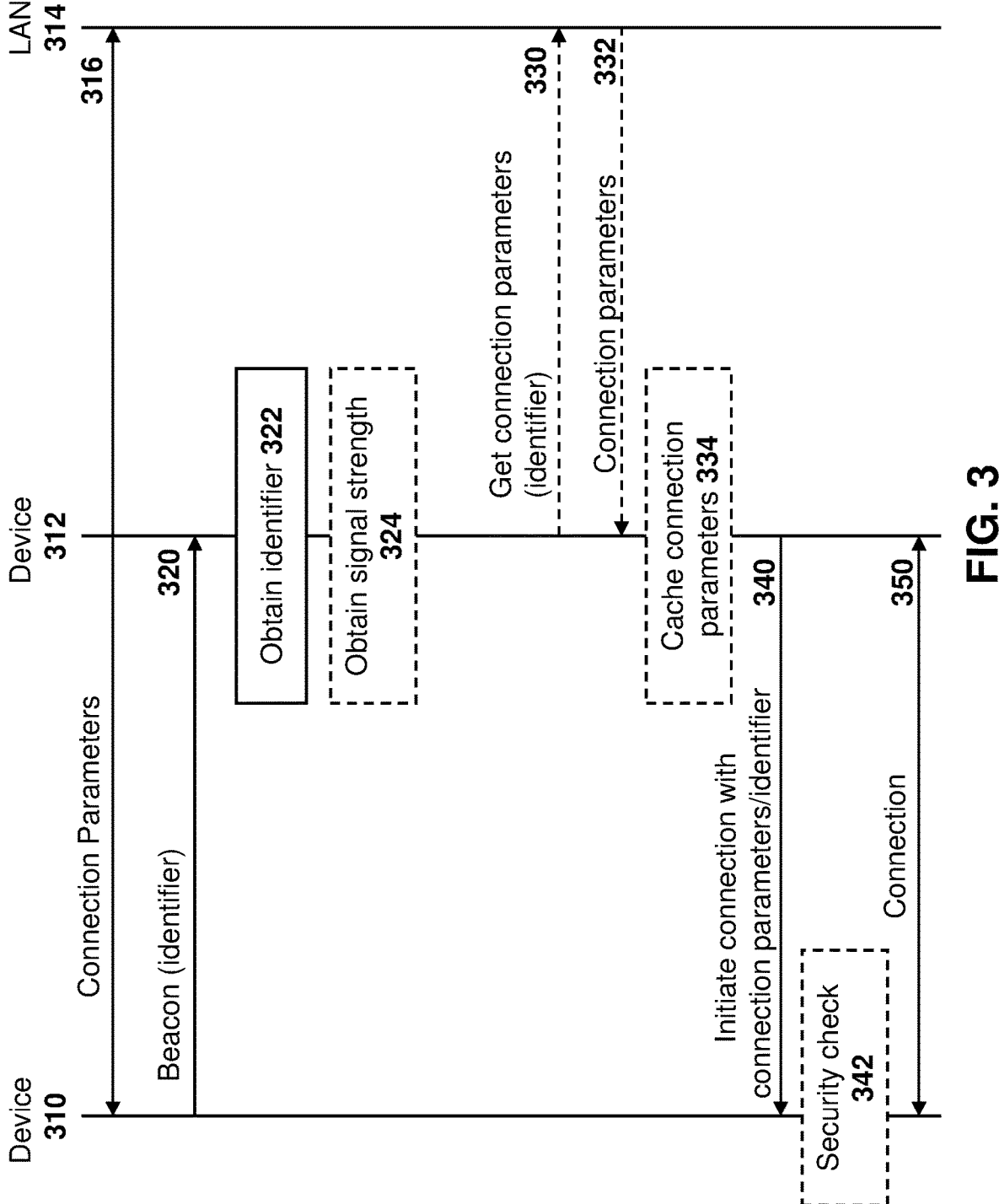
FIG. 3 is a dataflow diagram showing the creation of a connection and pairing of a first device and a second device.

Reference is now made to FIG. 3, which shows an example of the establishment of the connection between a first device 310 and a second device 312. In some cases, the connection establishment may further involve a local area network 314.

A device may provide connection parameters for LAN network discovery to local area network 314, as shown with message 316. For example, a device 310 may broadcast itself to LAN 314 as a service available on the network, similar to the way a shared printer advertises itself on the network. This may be similar to the broadcast provided in Table 1.

TABLE 1

| Broadcast Information |
| --- |
| Network Service: {<br>    "Name": "POS Go (1234)",<br>    "ID": "836747826.284672947" // Major.Minor<br>    "ConnectionString":<br>"192.168.86.27;27000;27001;463845hdgh278eh2w8dh38dhwjwjwoi2i;5;1"<br>    } |

For example, the connection parameters in Table 1 comprise a string that includes the IP address (92.168.86.27), a port number to download an SSL certificate (27000), a port number to establish the connection (27001), an SSL certificate hash (463845hdgh278eh2w8dh38dhwjwjwoi2i), a schema version number (5), and a device type (1), among other information. However, other types of information may be available in the connection parameters, and, in practice, the connection parameters may include more information, less information, or different information. For example, in some cases the connection does not need to be encrypted, and therefore a Transport Layer Security (TLS)/SSL connection is not needed. In this case the port for the SSL certificate and the SSL certificate hash do not need to be provided in the connection parameters. The example above is merely provided for illustration.

As will be appreciated by those in the art, the connection parameters may not be completely static. For example, the DHCP may change the IP address for the device and therefore the connection parameters for the device may change. In this regard, message 316 may be periodically transmitted and may provide the most recent connection parameters. This allows LAN 314 to update its network discovery.

Referring again to FIG. 3, device 310 may transmit a beacon with an identifier, as shown by beacon 320. In practice, the beacon is limited in terms of the payload that can be sent within the beacon. In particular, often the beacon would not be large enough to include parameters such as an entire connection string. In this case, the beacon may provide specific information. One example beacon is provided below in Table 2.

TABLE 2

| Beacon Information |
| --- |
| beacon: {<br>    "UUID": "374dsds571923dsdsd464dsdsds8926ds7482q89"<br>    "Major": 836747826,<br>    "Minor": 284672947,<br>    } |

In Table 2, the UUID is static, and always the same for network discovery of a first type of device 310 and would be known to the second type of device 312. The UUID may be indicative of a discovery service. Thus, in one illustrative embodiment, a display device may transmit the beacon with the UUID and Point of Sale (POS) devices would know to look for such UUID, which would signal to the PoS devices that a screen is nearby and can be connected to.

In this case, device 312 would register within its operating system to scan for beacons having this specific UUID.

The beacon may further include an identifier for device 310. For example, in Table 2 this is shown as a major and minor identifier combination. In some cases, the major/minor combination may be dynamically generated for a specific storefront installation and persisted. In some cases, the identifier can be randomly generated or make use of the digits in the serial number of the device, among other options. In any case, the identifier would uniquely identify the device 310 within the network.

Upon device 312 receiving beacon 320, it may check the UUID at block 322 to ensure that the beacon is for network discovery of a second device, and the device 312 then may obtain the identifier from the beacon signal.

In some cases, the device 312 may further obtain a signal strength for the received beacon 320, shown at block 324. The received signal strength may be compared with a known transmission signal strength to obtain proximity information for the beacon signal.

However, in some cases, proximity information may be obtained in other ways. For example, the beacon may transmit the signal the strength with which the beacon signal was transmitted rather than using a preconfigured, known signal strength. In some cases, location information may be used instead of signal strength information. Other options are possible.

Device 312 can then determine the signal strength of the received signal and do a comparison to find the proximity of the device transmitting the beacon. In some cases, the proximity may be classified with discrete identifiers such as "immediate", "near" or "far". In other cases, the proximity could be an absolute value based on the difference between the received signal strength and the transmitted signal strength.

In some embodiments, the device 312 may not proceed further if the proximity is above a defined threshold distance. This may indicate that the devices are too far apart to establish a connection. In some cases, the beacon may continue to be received and the device will do nothing until it is determined that the proximity is within a defined threshold, at which time the device 312 may then continue to attempt to establish a connection.

In some embodiments, if device 312 receives a plurality of beacon signals, it may choose the closest device to pair with based on the beacon signals.

While the embodiment of FIG. 3 shows the obtaining of proximity information, in some cases this information is not important and as long as the device 312 can see the beacon 320, this may be close enough. Therefore, the determination of proximity at block 324 is optional.

Further, in some cases the device 312 may check a cache at the device, shown at block 326, to determine whether the identifier is known at device 312 and can therefore be mapped to connection parameters to connect with device 310. This checking of the cache at block 326 is however optional.

If the identifier is not found within the cache, as determined at block 326, or if no cache exists on the device, then the device 312 may query LAN 314 to obtain connection parameters based on the identifier. In particular, the device 312 may send a request 330 to LAN 314 to get the connection parameters by providing the identifier from the beacon. LAN 314 may return a response 332 with the connection parameters for device 310. As will be appreciated by those in the art, this request is a local request, and thus there significantly less delay than transmitting to a remote server or cloud service.

While the embodiment of FIG. 3 shows a request and response, in other cases the LAN may publish a table that device 312 may have access to. In this case, the device may have to search the network for all devices using the connection service and then filter out to the one having the specific identifier that comes from the beacon.

From the above, by using LAN discovery to find the connection parameters, this ensures that device 310 is connected to and has been verified by the LAN.

Upon receiving a message 332 or determining the connection parameters, device 312 may optionally cache the connection parameters, as shown at block 334.

Device 312 may then initiate a connection using the connection parameters or identifier with device 310, shown at block 340.

In some cases, the obtaining of the connection parameters and the initiating of the connection with device 310 may be predicated on proximity between device 310 and device 312 being within a particular threshold distance. This may, for example, mean that the received signal strength for the beacon message 320 must exceed a particular threshold. If the signal strength does not meet the threshold, then the initiation of the connection may not occur until such threshold signal strength has been met.

In some cases, security or device verification may be used during the connection process, as shown at block 342. For example, the device 310 may display a PIN, code or other identifier which may need to be input into device 312. In some cases, any other form of off band security check may be performed. For example, device 310 could just display a few digits and ask the user to verify that the same digits are also shown on device 312. Other options are possible.

Assuming success, the connection 350 is established and a pairing relationship between device 310 and device 312 is established based on the connection.

Dynamic Switching

While the embodiment of FIG. 3 provides a connection between a first device and a second device, in some cases it may be desirable to connect to the closest device. Therefore, if a third device moves into proximity with the connected devices, a new connection may need to be established. In this regard, in one embodiment a dynamic switching process may be utilized. The dynamic switching can take two forms. In a first, the device that is providing the beacon may need to switch to a device that moves into closer proximity. This embodiment is described below with regard to FIGS. 4 and 5. In a second case, the device receiving the beacon may need to switch to a closer device. This is described with regard to FIG. 6.

Figure 4:
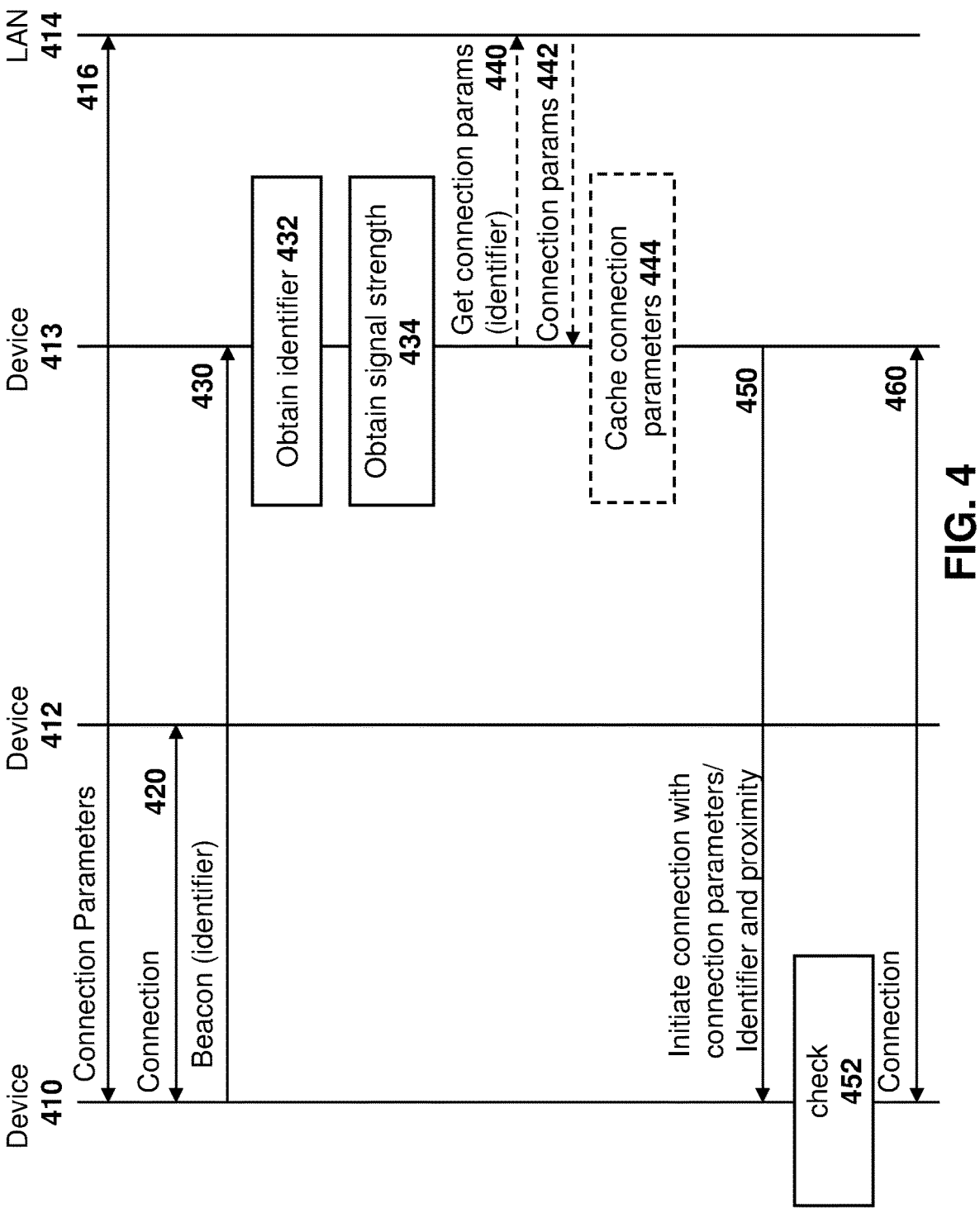
FIG. 4 is a dataflow diagram showing connection reestablishment when a proximity between a first beacon transmitting device and a third device is closer than a proximity between a second device and the first device.

Reference is now made to FIG. 4. In the embodiment of FIG. 4, device 410 is the device that sends out its beacon. For example, in one case this may be the stationary screen device which is signalling to mobile point of sale devices that it is present. Further, similar to the embodiment of FIG. 3, the device 410 may broadcast connection parameters to the local area network 414.

In the embodiment of FIG. 4, a connection 420 to a device 412 may already be established. As will be appreciated by those in the art, the establishment of connection 420 may use the process of FIG. 3 in some cases.

However, while in some cases the connection may result in a beacon ceasing to be transmitted, in the embodiment of FIG. 4, device 410 continues to send a beacon 430, where such beacon contains the identifier for the device. For example, the beacon may contain the information provided in Table 2 above.

On receiving the beacon 430, a device 413 may obtain the identifier from the beacon, as shown at block 432. The device 413 may further obtain the signal strength, as shown at block 434. For example, the beacon may be transmitted at a standard power level, or the transmit power level is encoded in the beacon. The receiving device then determines proximity (which may include enumerated values such as immediate/near/far) by comparing the expected transmit power (per standard or per an encoded value) with the received power level.

Similar to the process of FIG. 3, the device 413 may check a local cache to determine whether the identifier is found in a lookup table and therefore connection parameters are already stored on the device. If not, the process may get connection parameters from LAN 414, as shown with request 440 and response 442.

In some cases, the device 413 may cache any connection parameters received in response 442, as shown at block 444.

In this case, device 413 may then initiate a connection with connection parameters or identifier and with proximity information obtained at block 432, shown with message 450.

Device 410 receives message 450 and may check to determine whether the proximity information in message 450 is closer to the device 410 then the proximity of device 412. In this case, device 410 will need to know the proximity of device 412 and this may be reported (not shown) either during the connection establishment or periodically over connection 420.

Device 410 may then perform a check at block 452 to determine whether device 413 is closer than device 412. If yes, device 410 may complete a connection 460 with device 413, establish a pairing relationship with device 413, and drop the connection 420.

Figure 5:
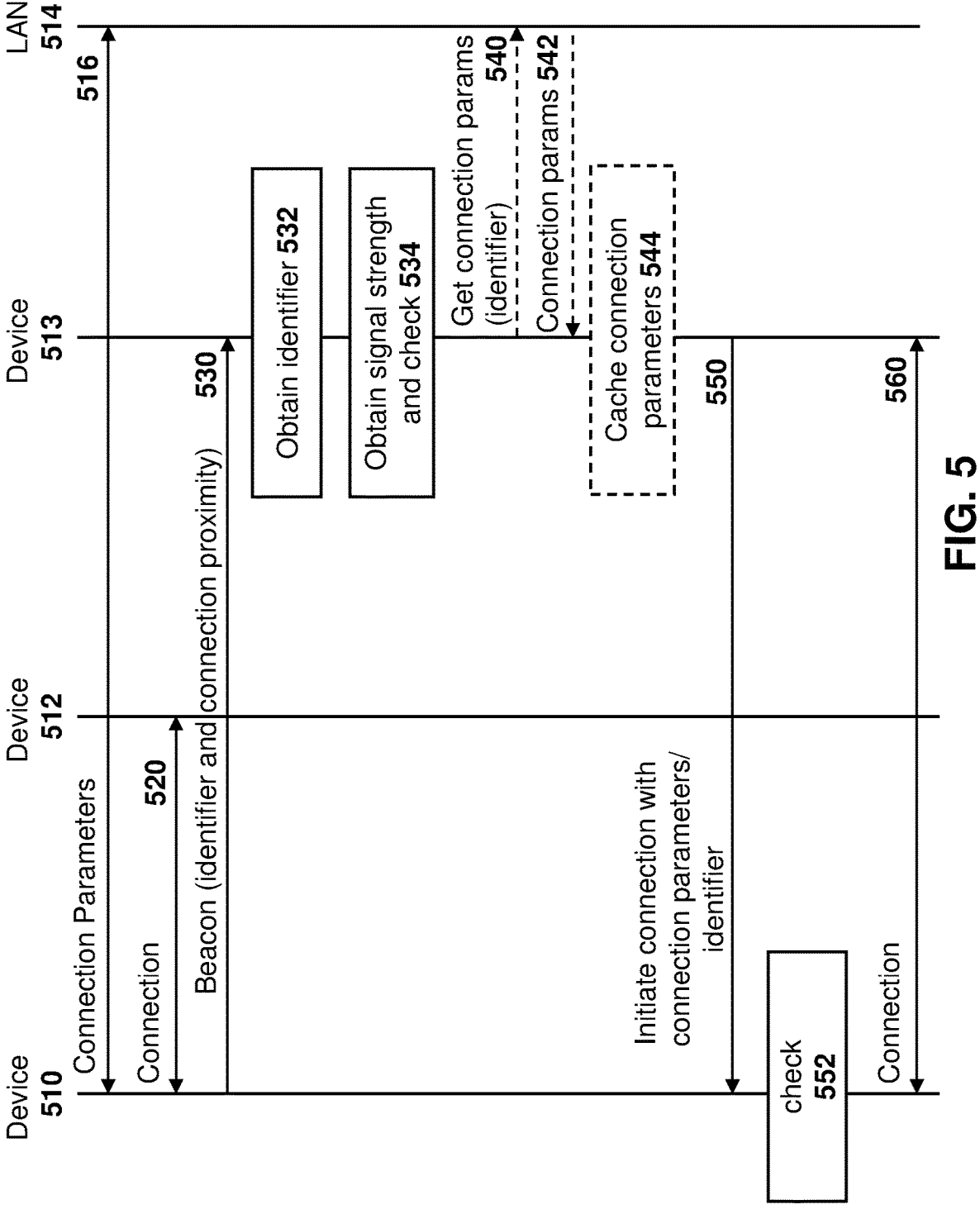
FIG. 5 is a dataflow diagram showing a further embodiment of connection reestablishment when a proximity between a first beacon transmitting device and a third device is closer than a proximity between a second device and the first device.

In an alternative embodiment, rather than the device sending the beacon checking whether the new device is closer than the currently connected device, proximity information for a current connection may be provided in a beacon. Reference is now made to FIG. 5.

In the embodiment of FIG. 5, a device 510 may provide connection parameters 516 to a LAN 514. Further, device 510 is already connected to device 512, as shown with connection 520.

Device 510 may know its proximity to device 512, for example based on device 512 reporting this back to device 510 (not shown).

Device 510 may continue to send a beacon 530. In this case, beacon 530 may be modified to include both the identifier for device 510, for example as shown in Table 2 above, as well as information about any current connection device 510 has. In this case, connection proximity information may be an enumerated value that is added with a few bits within the beacon. For example, values such as "immediate", "near" or "far" may be enumerated with only two bits in a beacon, where a reserved value may indicate that no connection exists currently. However, other options are possible.

In this case, device 513 may receive beacon 530 and obtain the identifier from the beacon at block 532. Further, device 513 may obtain the signal strength of the beacon 530 and check at block 534 whether the proximity of the device 510 is closer than the value indicated within the beacon signal. If no, the device 513 may ignore the beacon.

However, if the proximity of device 510 to device 513 is closer than the value indicated in the beacon 530, then device 513 may check whether the connection parameters for device 510 is stored at device 513. If not, the device 513 may query LAN 514 with request 540 to get the connection parameters based on the identifier obtained at block 532. Device 513 may then receive a response 542 with the connection parameters.

In some cases, device 513 may cache the connection parameters at block 544.

In the embodiment of FIG. 5, device 513 may then initiate the connection using the connection parameters or identifier for the device, as shown with message 550. In some cases the device 510 may assume that the initiation of the connection with message 550 indicates that device 513 has checked the proximity and a connection 560 may therefore be established along with a pairing relationship. In other cases, message 550 may further include proximity information which device 510 may check at block 552 before the establishment of the connection 560.

Therefore, based on the embodiments of FIGS. 4 and 5, a device that sends beacons may still connect to a device that comes into closer proximity than the device with which the connection is currently established.

Further, in some embodiments the elements from FIGS. 4 and 5 could be combined, thus allowing determinations of whether to establish a new connection to be made in more than one device. Other combinations of these references is also possible.

Figure 6:
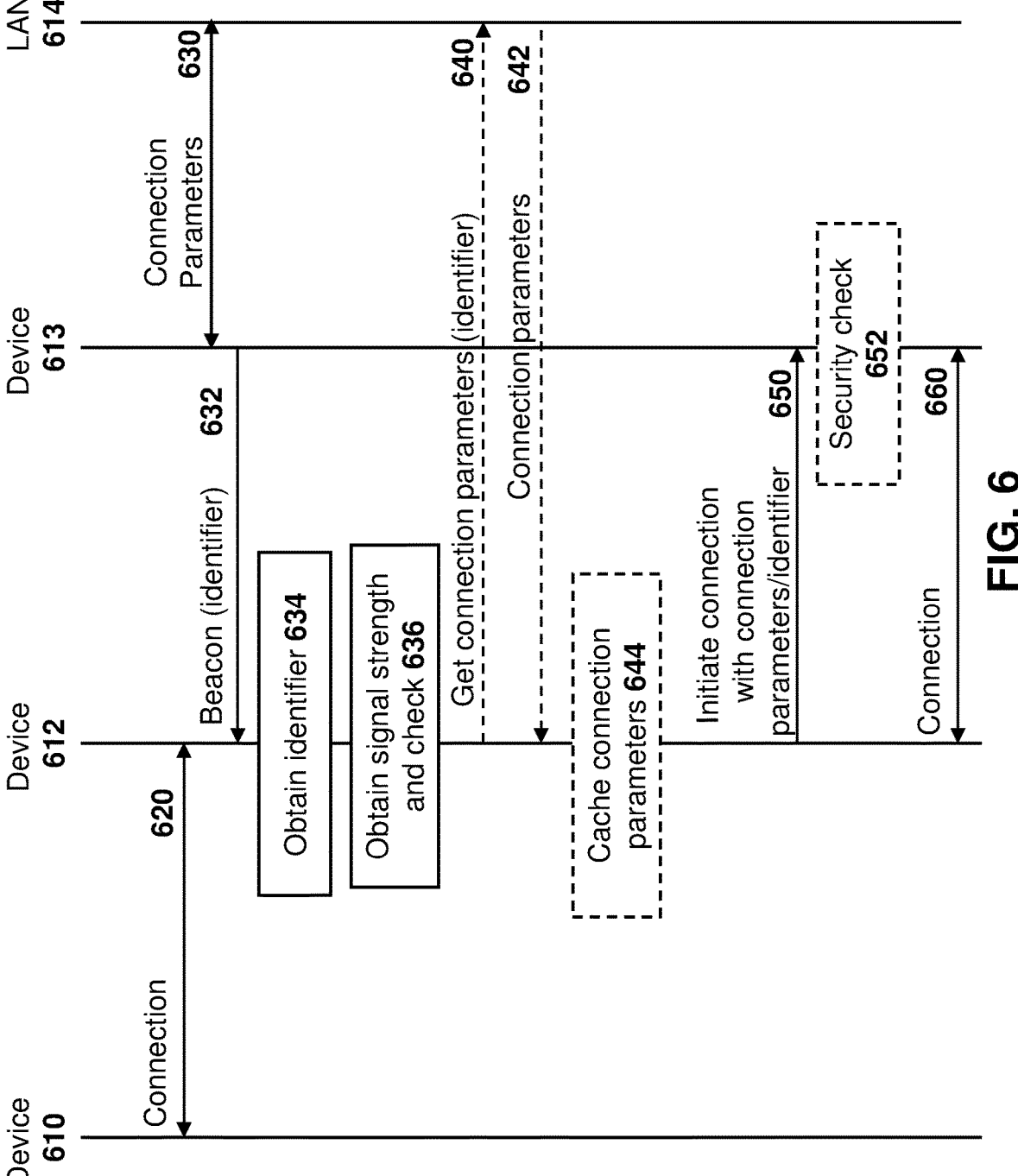
FIG. 6 is a dataflow diagram showing connection reestablishment when a proximity between a first device and a third beacon transmitting device is closer than a proximity between a second beacon transmitting device and the first device.

In a further embodiment, it may be the device receiving beacons which may make the determination that another device is closer, and a new connection needs to be established. Reference is now made to FIG. 6.

In the embodiment of FIG. 6, a device 610 may be connected to a device 612. In this case, a device 613 and a device 612 may come into proximity of each other.

Device 613 may broadcast its connection parameters to LAN 614, as shown with message 630. Further, device 613 may send a beacon 632 having an identifier for device 613.

Device 612 may receive beacon 632 and may obtain the identifier for the beacon at block 634. Device 612 may further obtain the signal strength of beacon 632 at block 636. Further, a check may be performed at block 636 to determine whether the signal strength of the beacon 632 indicates that the proximity of device 613 is closer than the device 610.

If no, then the device 612 may simply ignore beacon 632.

However, if device 613 is closer than device 610, the device 612 may check whether it has connection parameters for device 613 and, if not, may obtain the connection parameters by sending a message 640 to LAN 614 requesting the connection parameters. LAN 614 may respond with the connection parameters, shown as response 642.

Device 612 may then optionally cache the connection parameters in some embodiments, as shown at block 644.

The device 612 may then initiate a connection using the connection parameters at message 650. In some cases, device 613, on receiving message 650, may perform a security check, as shown at block 652, and a connection 660 and pairing relationship may thereafter be established.

Therefore, in accordance with the embodiment of FIG. 6, a device that detects a stronger beacon signal can establish a new connection with a third device.

Reestablishing Connection

In some cases, a connection between the first device and the second device may be dropped. This may be based on various factors, such as a temporary network outage which may disrupt the pairing of the devices, a battery in a device running out, interference in communications between the devices, among other factors.

Figure 7:
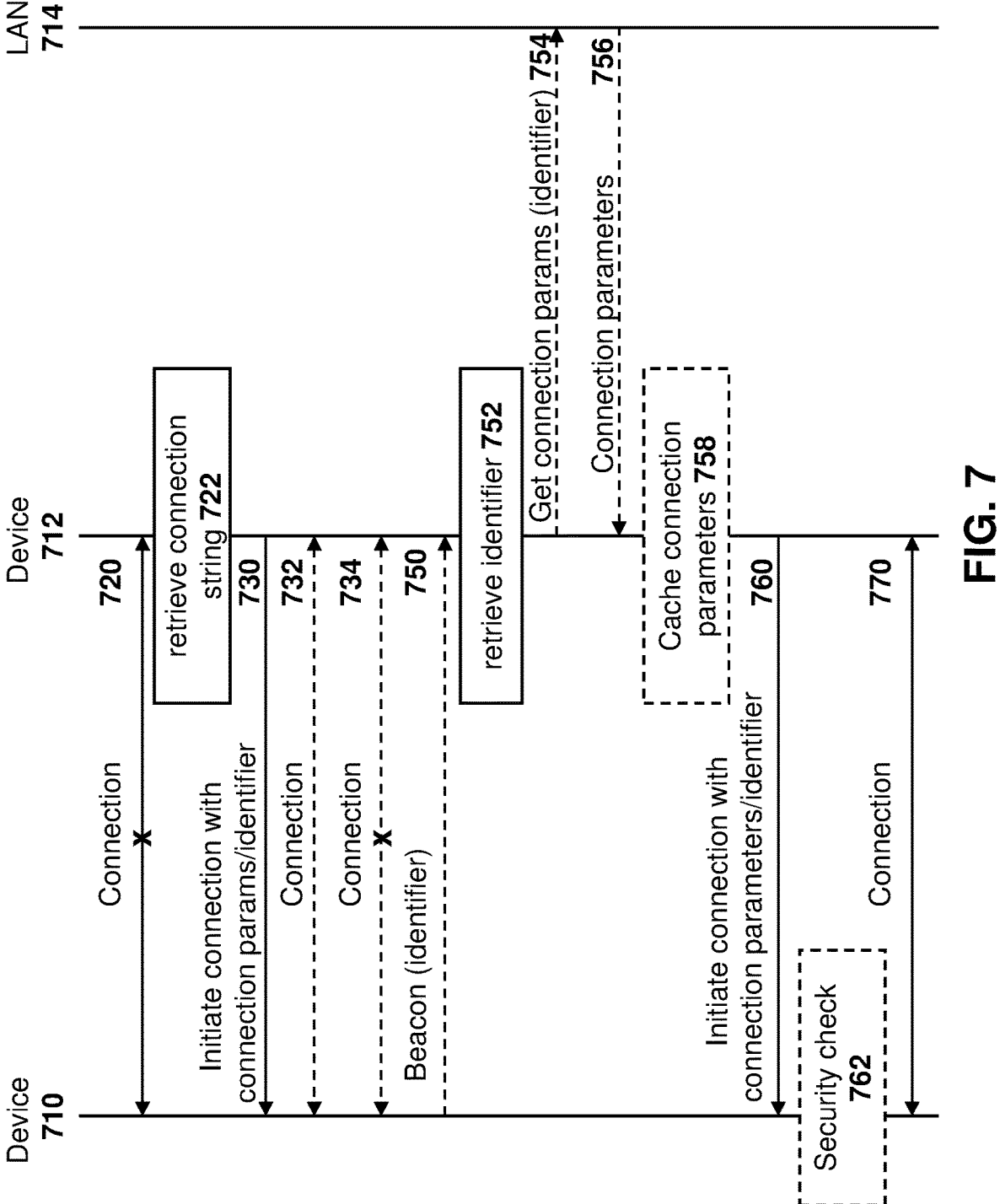
FIG. 7 is a dataflow diagram showing connection reestablishment when a connection between a device and a second device is dropped.

In this case, the devices may seek to automatically reconnect and re-pair. Reference is now made to FIG. 7.

In the embodiment of FIG. 7, a device 710 was previously connected with a device 712. According to FIG. 7, the connection has dropped, as shown with arrow 720.

In one example embodiment, the device 712 may have cached the connection parameters for device 710, and at block 722 may retrieve the connection parameters from the cache.

Device 712 may then initiate a connection using the retrieved connection parameters from block 722, shown with message 730.

In some cases, the initiation of the connection using the connection parameters may be successful, as shown with connection 732. In this case, device 710 and device 712 may be paired and continue to communicate normally.

However, in some cases the connection may be unsuccessful, as shown with arrow 734. This may occur, for example, when connection parameters have changed or if device 710 is unreachable.

In this regard, device 712 in some embodiments may listen to determine whether a beacon 750 has been received from device 710. However, this is optional and in some cases device 712 may assume that the connection parameters have changed and not listen for a beacon.

In either case, the device 712 may retrieve the identifier at block 752. The retrieval of the identifier at block 752 may either be done from a cache or may be based on a received beacon 750.

Based on the retrieved identifier, a request 754 may be made to LAN 714 using the identifier, and new connection parameters may be received in message 756 at device 712. Device 712 may optionally cache such connection parameters at block 758 and then may use the new connection parameters to initiate a connection with message 760.

Alternatively, in some cases, at block 752 the device 712 obtain the device identifier and may scan the network for the same device's identifier that was cached to find the updated IP. For example, in some cases the beacon may only be used for the initial pairing the first time. From there, a device's identifier (e.g. Major and Minor) may be stored, and whenever connection breaks, the network may be scanned to find the same device based on the identifier (but with possibly updated IP).

Other options are possible.

Device 710, if it receives message 760 may optionally perform a security check at block 762. If the connection is allowed to be established, then a connection 770 may be re-established between device 710 and device 712.

Thus, according to the embodiments of FIG. 7, various re-connection options may exist, including using stored connection parameters, retrieving new connection parameters, listening for beacons to ensure that the other device is still within range, among other options.

Fallback Connection Attempts

In some cases, connection may be a multi-stage process, where the use of the beacon discovery process may be attempted first. However, if the beacon discovery process does not work, fallback options such as LAN discovery or QR code discovery may be used. A sequence for attempts may be defined. In this way, if one connection technique does not work then other options are available for establishing the connection.

Figure 8:
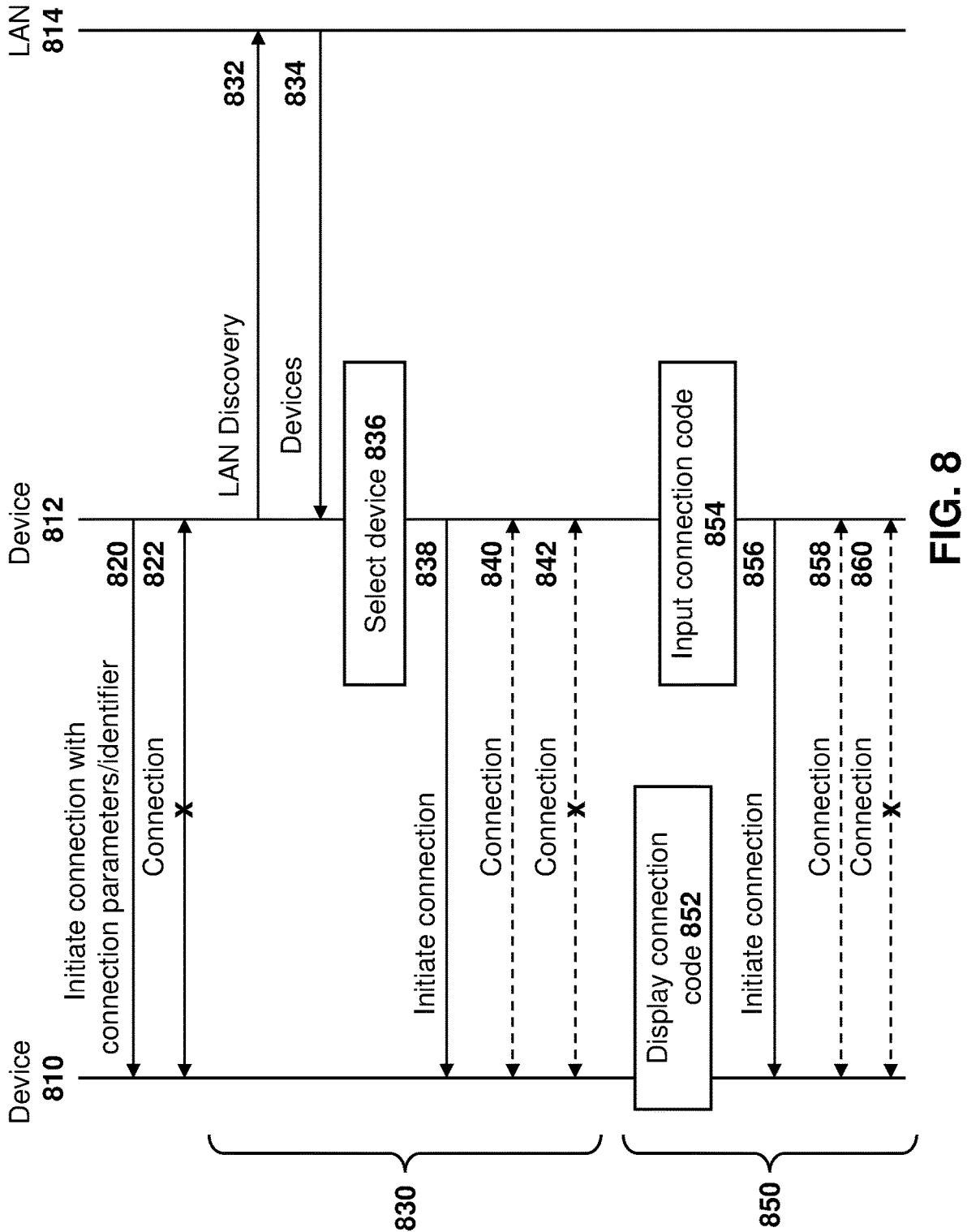
FIG. 8 is a dataflow diagram showing connection fallback options when a connection between a device and a second device fails using the embodiment of FIG. 3.

Reference is now made to FIG. 8. In the embodiment of FIG. 8, a device 810 may transmit beacons and a device 812 may receive such beacons and wish to initiate a connection with device 810. For example, the process of FIG. 3 may be utilized. In this regard, device 812 may send a message 820 with a request to initiate a connection utilizing the connection parameters or identifier. However, in this case, the connection 822 is not established. There may be a variety of reasons for this, including incorrect connection parameters, or the inability to correctly identify the device from the identifier transmitted in a beacon, among other options.

In this regard, the process of FIG. 8 proceeds to a first fallback option. Specifically, fallback option 830 includes a LAN discovery and device selection. In particular, device 812 may send a LAN discovery message 832 to LAN 814. LAN 814 may then provide a list of devices in message 834 back to device 812.

Device 812 may then select an appropriate device to connect to at block 836. This may be done based, for example, on identifiers or identifying information from a list of devices provided in block 834. In other cases, the device 812 could randomly select devices. In other cases, device 812 may provide a user interface with the names of devices for user selection. If the devices are named appropriately, in some cases the selection at block 836 may consist of the user or the computing device selecting an appropriate device 810 based on its name. Other options are possible.

Upon selecting a device at block 836, the device 812 may initiate a connection, as shown with message 838, which is sent to device 810.

Upon receiving message 838, in some cases a connection 840 may be established. In other cases, no connection may be established as shown with arrow 842.

If no connection is established, then the device may try to fallback to a second fallback connection option 850. Second fall back connection option 850 may include the display of a connection code on device 810, as shown with block 852. The display of the connection code may, for example, be a result of user interaction with device 810 in some cases.

In some cases, the connection code 852 may be a human readable connection code which may be entered, for example, through a keyboard on device 812 at block 854.

In some cases, the connection code displayed at block 852 may be a barcode, QR code or other form of machine readable code which may be used to input the connection code at block 854 on a device 812. For example, device 812 may have a camera that can scan a QR code which contains the connection code.

In some cases, the same code may be displayed on both devices and a verification input may be required.

Other options for the display of codes and the input of the codes are possible.

Once the code is inputted at device 812, the code may be used to initiate a connection as shown with message 856. In this case, the connection may be successful, as shown with arrow 858 or may be unsuccessful, as shown with arrow 860.

In practice, zero, one or more fallback options may exist at device 812 to pair with device 810. The selection of the fallback option, and the order of the fallback options if more than one exists, could be determined by those administering or creating the computing system. Thus, fallback option 830 does not necessarily have to be the first fallback option and may come after fallback option 850 in some cases, or may not be part of the system at all in some cases.

Retail Example

In one example use case for the systems and methods of the present disclosure, a retail environment could exist in which portable point of sale terminals may be used by salespersons walking around the retail space. When a customer wishes to purchase one or more items, they may approach a salesperson who can then start a transaction for them.

However, in order for the transaction to proceed, in some cases the customer may need to have the items being purchased, the price of the items, a running subtotal, or other information displayed to them. In this regard, the portable point of sale terminal can be connected with a display device for a customer to monitor the transaction.

In this case, the display device may transmit a beacon as described above. The point of sale device may receive the beacon and determine the closest display device to connect to. In this regard, the point of sale device could find the identifier from the strongest beacon signal and either retrieve cached connection parameters or do a local request on the local area network to obtain connection parameters to connect to the display device.

The point of sale device would in this case be device 312 and the display device would be device 310 from the embodiment of FIG. 3. In this regard, the methods and data exchange of FIG. 3 could then occur in order to establish a connection between the point of sale device and the display device.

Once the connection is established, the scanning of items could bring up a corresponding display on the display device to allow a customer to monitor the transaction. Once the transaction was finished, the point of sale device could break the connection and move on in some cases.

If the connection was unsuccessful using the beacon discovery, a fallback connection attempt may be made utilizing the embodiment of FIG. 8.

If the connection was dropped during the transaction, a re-connection attempt as described in FIG. 7 could be made.

Further, in some cases, if the point of sale device is still moving, a connection attempt to a new device, as for example described in FIG. 4, 5 or 6, could occur if the point of sale device moves closer to a new display device.

However, other use cases are possible.

Computer System

The above devices, servers, and network elements may be implemented on any computer system. One example computer system is illustrated with regard to FIG. 9.

Figure 9:
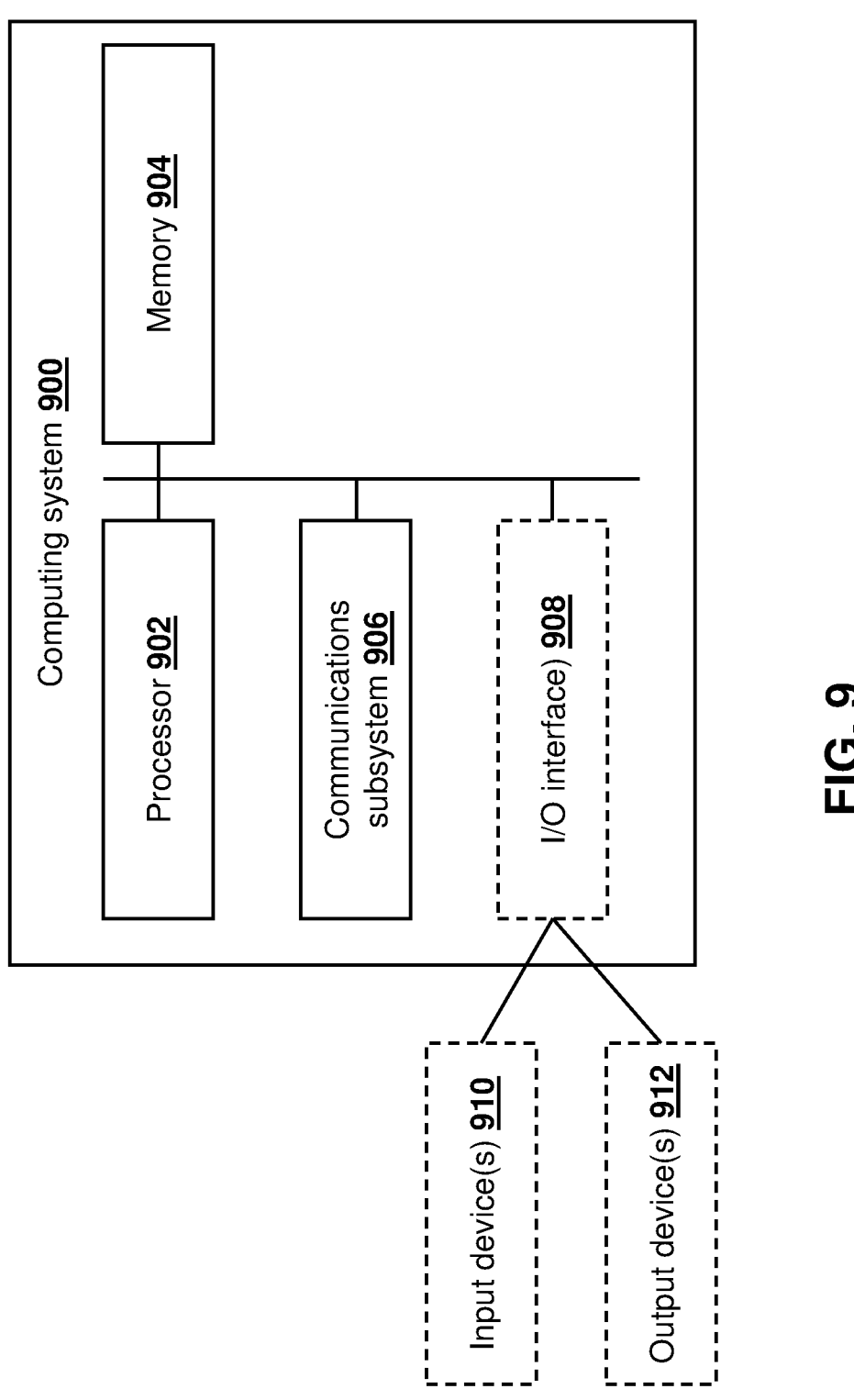
FIG. 9 is a block diagram of a simplified computing device capable of being used with the embodiments of the present disclosure.

FIG. 9 illustrates an example computing system 900, which may be used to implement examples of the present disclosure, such as a device sending a beacon, a device receiving a beacon, a server for a LAN, or other network element. For example, a plurality of instances of the example computing system 900 may cooperate to provide the pairing of devices as discussed above.

The example computing system 900 includes at least one processing unit, such as a processor 902, and at least one physical memory 904. The processor 902 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 904 may include a volatile or non-volatile memory (e.g., a flash memory, a random access memory (RAM), and/or a read-only memory (ROM)), and may be non-transitory. The memory 904 may store instructions for execution by the processor 902, to the computing system 900 to carry out examples of the methods, functionalities, systems and modules disclosed herein.

The computing system 900 may also include at least one communications subsystem 906 for wired and/or wireless communications with an external device, system and/or network (e.g., an intranet, the Internet, a P2P network, a WAN and/or a LAN). A communications subsystem may enable the computing system 900 to carry out communications (e.g., wireless communications) with systems external to the computing system 900. Communications subsystem 406 may include more than one communications technology, and could, for example, communicate using one or more of an ethernet connection, a Wi-Fi connection, a ZigBee connection, an IrDA connection, a Bluetooth connection, a BLE connection, among others. The design of the communications subsystem 906 will thus depend on the communication protocol(s) the subsystem is designed for.

The computing system 900 may optionally include at least one input/output (I/O) interface 908, which may interface with optional input device(s) 910 and/or optional output device(s) 912. Input device(s) 910 may include, for example, buttons, a microphone, a touchscreen, a keyboard, etc. Output device(s) 912 may include, for example, a display, a speaker, etc. In this example, optional input device(s) 910 and optional output device(s) 912 are shown external to the computing system 900. In other examples, one or more of the input device(s) 910 and/or output device(s) 912 may be an internal component of the computing system 900.

While the embodiments above describe interrogators and secondary sensors as being distinct, in some embodiments the interrogators and secondary sensors may be part of the same physical component. The present disclosure is thus not limited to any particular configuration for the interrogators and the secondary sensors.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:

receiving, at a first device from a second device, a wireless beacon transmission;

obtaining, by the first device from the wireless beacon transmission, an identifier for the second device;

initiating, by the first device, a connection to the second device via a local area network using connection parameters determined based on the identifier, the initiating:

using the identifier in a local area network discovery query to obtain the connection parameters for the second device; and initiating a connection to the second device using the connection parameters; and establishing a pairing relationship between the first device and the second device based on the connection.

2. The method of claim 1, further comprising:

determining, based on a signal strength of the beacon, a proximity of the first device to the second device, wherein the receiving, obtaining, initiating, and establishing is conditioned on the proximity being within a determined threshold.

3. The method of claim 1, wherein a plurality of second devices are part of the local area network, the method further comprising:

determining, based on a signal strength of the beacon, the second device from the plurality of second devices that is closest to the first device; and performing the extracting, using and connecting with the determined second device.

4. The method of claim 3, further comprising:

receiving, at the first device from a third device, a wireless beacon transmission, the third device being one of the plurality of second devices;

obtaining, by the first device from the wireless beacon transmission, a third device identifier;

determining, at the first device, that the third device has a proximity closer than the second device;

initiating, by the first device, a connection to the third device via a local area network using connection parameters determined based on the third device identifier; and establishing a pairing relationship between the first device and the third device based on the connection.

5. The method of claim 1, further comprising:

detecting a loss of the connection with the second device;

using stored connection parameters to reestablish the connection between the first device and second device.

6. The method of claim 5, further comprising:

determining that the reestablishment of the connection between the first device and the second device was unsuccessful;

detecting the beacon;

using an identifier in the beacon to obtain new connection parameters; and using the new connection parameters to reestablish the connection between the first device and second device.

7. The method of claim 1, further comprising:

determining that the connecting was unsuccessful; and utilising a secondary connection process to pair the first device and the second device.

8. The method of claim 7, wherein the secondary connection process is at least one of a Local Area Network Discovery process; and a display of a connection code on the second device for input into the first device.

9. The method of claim 1, wherein the connecting further comprises:

receiving, via a user interface of the first device, a code displayed on the second device.

10. The method of claim 1, wherein the connection parameters are a string that is larger than a payload capacity for the wireless beacon transmission.

11. A first device comprising:

a processor; and a communications subsystem, wherein the first device is configured to:

receive, at the first device from a second device, a wireless beacon transmission;

obtain from the wireless beacon transmission, an identifier for the second device;

initiate a connection to the second device via a local area network using connection parameters determined based on the identifier, by:

using the identifier in a local area network discovery query to obtain the connection parameters for the second device; and initiating a connection to the second device using the connection parameters; and establish a pairing relationship between the first device and the second device based on the connection.

12. The first device of claim 11, wherein the first device is further configured to:

determine, based on a signal strength of the beacon, a proximity of the first device to the second device, wherein the first device is conditioned to receive, obtain, initiate, and establish based on the proximity being within a determined threshold.

13. The first device of claim 11, wherein a plurality of second devices are part of the local area network, the first device further configured to:

determine, based on a signal strength of the beacon, the second device from the plurality of second devices that is closest to the first device; and perform the extracting, using and connecting with the determined second device.

14. The first device of claim 13, wherein the first device is further configured to:

receive, from a third device, a wireless beacon transmission, the third device being one of the plurality of second devices;

obtain, from the wireless beacon transmission, a third device identifier;

determine, at the first device, that the third device has a proximity closer than the second device;

initiate a connection to the third device via a local area network using connection parameters determined based on the third device identifier; and establish a pairing relationship between the first device and the third device based on the connection.

15. The first device of claim 11, wherein the first device is further configured to:

detect a loss of the connection with the second device; and use stored connection parameters to reestablish the connection between the first device and second device.

16. The first device of claim 15, wherein the first device is further configured to:

determine that the reestablishment of the connection between the first device and the second device was unsuccessful;

detect the beacon;

use an identifier in the beacon to obtain new connection parameters; and use the new connection parameters to reestablish the connection between the first device and second device.

17. The first device of claim 11, wherein the first device is further configured to:

determine that the connecting was unsuccessful; and utilise a secondary connection process to pair the first device and the second device.

18. The first device of claim 17, wherein the secondary connection process is at least one of a Local Area Network Discovery process; and a display of a connection code on the second device for input into the first device.

19. The first device of claim 11, wherein the connection parameters are a string that is larger than a payload capacity for the wireless beacon transmission.

20. A non-transitory computer-readable medium for storing instruction code, which, when executed by a processor of a first device cause the first device to:

receive, at the first device from a second device, a wireless beacon transmission;

obtain from the wireless beacon transmission, an identifier for the second device;

initiate a connection to the second device via a local area network using connection parameters determined based on the identifier by:

using the identifier in a local area network discovery query to obtain the connection parameters for the second device; and initiating a connection to the second device using the connection parameters; and establish a pairing relationship between the first device and the second device based on the connection.

* * * * *